(No Model.)

H. V. LOSS.
HYDRAULIC PACKING.

No. 492,217. Patented Feb. 21, 1893.

WITNESSES:
Chas A. Mahony
Jno J Babcock

INVENTOR
Henrik V. Loss
by his attorney
Chas A. Rutter

UNITED STATES PATENT OFFICE.

HENRIK V. LOSS, OF PHILADELPHIA, PENNSYLVANIA.

HYDRAULIC PACKING.

SPECIFICATION forming part of Letters Patent No. 492,217, dated February 21, 1893.

Application filed May 10, 1892. Serial No. 432,421. (No model.)

*To all whom it may concern:*

Be it known that I, HENRIK V. LOSS, a citizen of the United States, and a resident of the city and county of Philadelphia and State of Pennsylvania, have invented certain new and useful Improvements in Hydraulic Packings, of which the following is a specification.

My invention relates to improvements in packings for hydraulic cylinders, and the object of my invention is to furnish a packing which is forced against the sliding surface by the pressure of the water in the cylinder and which may be adjusted by means of suitable mechanism to take up wear.

One of the greatest difficulties that the hydraulic engineer has to contend with is the matter of packings. The two forms of packing heretofore found to give the best results in machinery of this class are the ordinary hemp packing and the U or cup-shaped packing. The hemp packing has the advantage that it can be adjusted from the outside, simply by forcing in the gland to take up any leakage. This packing, however, causes an excessive friction,—by experiment from twenty to fifty per cent.

A further objection to the hemp packing is that the moving parts of the machinery tear off particles of the hemp which presently find their way into the valves, causing destruction generally. The U or cup packing is operated by the pressure of water to form the joint, and the friction that a packing of this kind causes is in direct proportion to the pressure of water in the cylinder. The U packing is expensive and offers but little body for wear. It has no means for adjustment, and a local leak cannot be taken up and the life of the packing is therefore short.

In my invention I aim to combine the adjustability of the hemp packing with the self-packing feature of the U ring, and my packing consists of a ring of elastic material, having preferably, partly or wholly, a wedge-shaped, cross section which is held in contact with the surface to be packed by a backing or ring of such shape that when the packing is forced in against it, it will cause this latter to be more tightly forced against the surface to be packed. The backing or wedge support for the ring is furnished with grooves through which the water under pressure can enter back of the elastic ring, forcing this out against the sliding surface.

In order to force the packing against the backing ring and to hold it in place in this ring I make use of a sleeve which bears against the packing and a gland by means of which said sleeve may be forced in.

Figure 1:
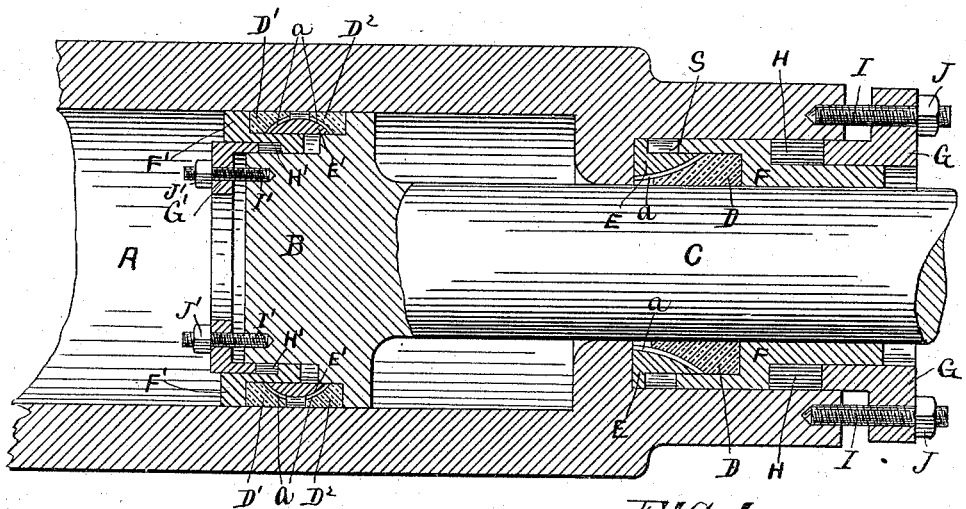
Figure 4:
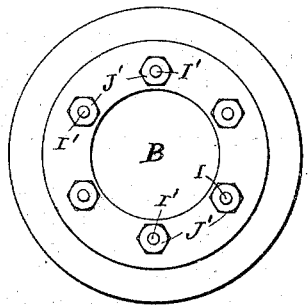
Figure 2:
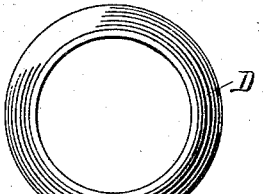
Figure 3:
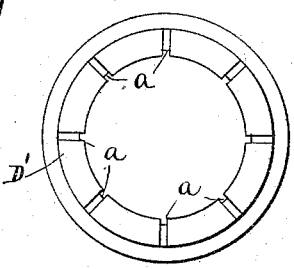
Figure 5:
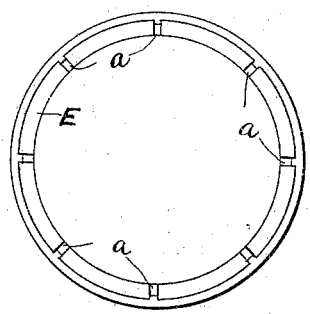

In the accompanying drawings forming a part of this specification and in which similar letters of reference indicate similar parts throughout the several views—Figure 1 is a central sectional elevation of part of a hydraulic cylinder, and piston and piston rod, showing my improved packing applied to the piston rod and piston: Fig. 2, a rear elevation of my packing as adapted to the piston rod: Fig. 3, a front elevation of the backing ring as applied to the piston rod. Fig. 4, an end elevation of the piston Fig. 1, and Fig. 5, a rear elevation of my packing as applied to the piston.

A. is a hydraulic cylinder, B. the piston, C. the piston rod.

D. D'. D². is my improved packing. As applied to the piston rod it consists of a ring of some elastic material, having a hole through its center for the passage of the piston rod and having preferably a wedge shaped cross section.

E. is a ring or backing which surrounds the piston rod and is seated within the cylinder casting. The interior of this ring is conical in form and the packing D. enters it at the larger end. If preferred, this ring may be turned from and form part of the cylinder A.

F. is a sleeve, the forward end of which surrounds the piston and the rear end of which passes over and secures the forward ends of the packing D. and backing E.

G. is a gland and H. a packing of any suitable material—hemp for instance, which is interposed between the gland G. and a shoulder on the sleeve F.

*a* are grooves upon the interior of the backing E., through which the water from the cylinder A. after passing along the piston rod C, finds its way to the top of the packing D. and exerts its pressure to close this packing tightly against the piston rod. There may be as many of these grooves as may be found necessary, in practice I have found six or eight to be sufficient. In putting the packing into place, the ring E. is first passed into the seat S. which is formed in the front end of the cylinder casting; the packing D. is next passed over the piston rod, its rear end projecting well into the larger end of the backing ring, as shown; the sleeve F. is next put into place and surrounds the top of the backing and bears also against the forward end of the packing D., while its sides bear against the cylinder A. and piston rod C. The hemp packing H., which prevents any escape of water between the sleeve F. and the cylinder A., is now put in place and finally the gland G. is put in place and forced in as tightly as necessary by means of the bolts I and nuts J.

The packing D. operates to maintain a tight joint around the piston rod C. by the pressure of water upon its back: when this packing wears, causing any leak around the piston rod, the gland G. is forced in farther by the bolts I. and nuts J. and drives in the sleeve F. which forces the packing D farther into the conical backing ring E. and this packing is thereby forced more tightly against the piston rod.

In applying my packing to the piston, it is necessary to have the periphery of the packing instead of its interior bear against the joint to be packed; it is also necessary to use two packings for this purpose, one to pack upon the forward stroke of the piston and the other upon its backward stroke.

D'. D²., Fig. 1, represent the piston packings. F', the sleeve. G', the gland. H' the hemp packing between the gland and sleeve. E' the backing ring which is higher in its middle than at either edge, forming a double wedge so that it acts to tighten both packings when being adjusted for wear.

In the drawings I have shown the piston packings furnished with grooves, $a$, to allow the water to pass freely up between the packings and the backing ring, instead of having the grooves in the backing ring as shown for the piston rod packing; and it will be understood that either arrangement of the grooves may be used.

The piston packings are tightened simultaneously by forcing the gland G' in by means of the bolts I'. and nuts J'., which force the sleeve F' in and cause the packing D' to be compressed and to move the backing ring, E' to expand and tighten the packing D².

The operation of the piston packings is similar to that described for the piston rod packing and will need no further explanation.

I claim—

1. The combination in a hydraulic packing of a packing ring of impermeable elastic material, having substantially a wedge-shaped cross section, and a backing ring having substantially a wedge-shaped cross section and provided with grooves or water ways so located that water from the cylinder may pass through them to the side or sides of the packing ring, which are opposite to its sliding surface.

2. The combination in a hydraulic packing of a cylinder and piston or piston rod, a packing ring having substantially a wedge-shaped cross section, a backing ring having substantially a wedge-shaped cross section, water ways between said backing and packing rings, one end of which communicates with the interior of the cylinder, a sleeve butting against the wedge-shaped packing, a gland, and a packing between said sleeve and gland, all substantially as set forth.

HENRIK V. LOSS.

Witnesses:
CHRISTOPHER FALLON,
CHAS. A. RUTTER.